Dec. 11, 1923. 1,476,788
C. M. ANDERSON
TEAT CUP FOR MILKING MACHINES
Filed Aug. 11, 1921
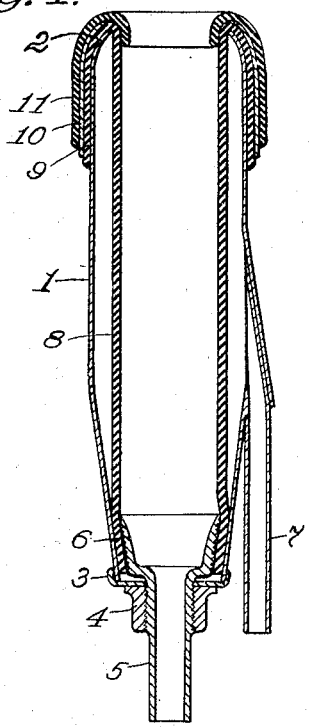
Fig. 1.
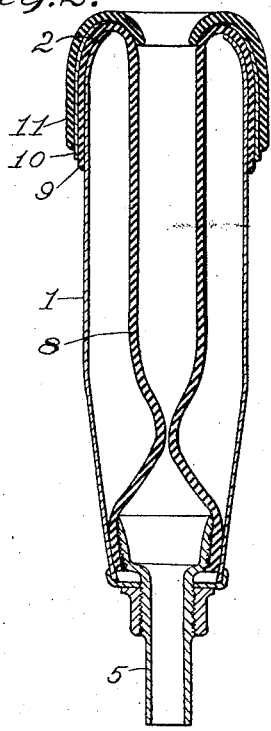
Fig. 2.
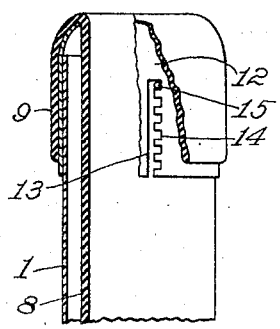
Fig. 4.
Fig. 3.
Inventor,
C. M. Anderson, by
Attorney.

Patented Dec. 11, 1923.

1,476,783

UNITED STATES PATENT OFFICE.

CHARLES M. ANDERSON, OF WATERLOO, IOWA.

TEAT CUP FOR MILKING MACHINES.

Application filed August 11, 1921. Serial No. 491,565.

*To all whom it may concern:*

Be it known that I, CHARLES M. ANDERSON, a citizen of the United States of America, and a resident of Waterloo, Blackhawk County, Iowa, have invented certain new and useful Improvements in Teat Cups for Milking Machines, of which the following is a specification.

My invention relates to improvements in teat-cups for milking machines, and the object of my improvement is to so construct the teat-receiving part of the teat-cup housing terminally as to adapt it to give the proper configuration to the teat-clasping end of the elastic teat-cup, thereby to render the action of the machine more efficient preventing injury to or discomfort of the teat.

This object I have accomplished by the means which are hereinafter described and claimed, and which are illustrated in the accompanying drawings, in which Figs. 1 and 2 are like central longitudinal sections of my improved teat-cup but taken at an angle of 90 degrees apart, and Figure 1 showing the uncompressed condition of the elastic teat-cup, while Figure 2 shows the compressed condition thereof. Fig. 3 is a plan of the teat-receiving end of said device, and Fig. 4 is a fragmentary view, partly in longitudinal section, and partly in elevation, with parts broken away, of the teat-receiving end of a modified form of the device.

Similar numerals of reference denote corresponding parts throughout the several views.

My improved teat-cup has the usual rigid tubular housing element 1, whose lower or discharging end is conically diminished and seated in a cupped part 3 of annular form. The numeral 5 denotes a tubular nipple to fit one end of a rubber tube, not shown, leading to the air exhausting mechanism of a milking machine. The inner end 6 of the part 5 is enlarged and flared outwardly, and positioned within the discharging end of a housing 1 in spaced concentric relation. The body of the nipple 5, without said housing, is medially exteriorly threaded to receive a nut 4 which clamps the cupped element 3 against the end of said housing. The other or teat-receiving end of the housing 1 is bent or curved inwardly at 2 for a purpose to be hereinafter explained.

The numeral 8 denotes the elastic tubular teat-receiving part of the device which is mounted concentrically within the housing 1 with its inner end clamped between the flaring part 6 and the inner wall of the housing. The outer face of said flaring part 6 is preferably corrugated as shown, to better frictionally grip the tube 8. The housing 1 has the usual nipple 7 opening into the interspace between it and the elastic tube 8 for connection to an elastic tube or hose not shown, leading to the milking machine proper. The other end of the tube 8 projects beyond the incurved end 2 of the housing 1, and is inverted thereover.

The device so far described will operate perfectly. I have, however, shown in Figs. 1 and 2, a securing cap 10 of cylindrical form with its upper end incurved similar to the incurved end 2 of the housing, but the cap 10 is of larger diameter so as to closely fit over and upon the inverted part 9 of the elastic tube 8, and frictionally tightly secure the part 9 in place. To prevent contact of the hard cap 10 with the sensitive udder of the animal, and also give a more yielding and non-conducting surface at that end of the device, I have mounted over and upon the cap 10 another cap 11 of soft rubber and of similar form, but whose upper end is introverted to enter a short distance within the open outer end of the tube 8. This furnishes a soft and elastic cushioning body surrounding the junction of the teat with the udder, and prevents much discomfort.

In Fig. 4 is shown a modification wherein the housing 1 has a removable adjustable terminal part 12, which can be adjusted longitudinally to vary the length of the teat-cup in case of necessity. This part 12 may be secured on the housing in a longitudinally adjusted position by any desirable means, as the form shown, is illustrative merely. The part 12 is slotted upwardly longitudinally at 13, and one longitudinal edge of the slot has a number of rectangular notches 14 into which a fixed pin 15 on the housing may be received according to the principle of a "bayonet-joint."

The incurved upper or teat-receiving end 2 of the housing 1 is particularly necessary and important in the action of the device. This is because the over-arching of the incurved end 2 provides an interspace between the housing and the straight walled tube 8 clear up to the extremity of the housing, whereby the action of a vacuum becomes effective throughout all that part of the length of the tube 8 which acts compressively upon the teat enclosed therein. This will be understood by referring to Fig. 2 where the tube 8 is shown in its position of compression about a teat, not shown, and in which position the teat is compressed equally throughout its entire length and consequently completely and naturally stripped of milk. Furthermore, the arching inwardly of the part 2 permits the inverted part 9 of the tube 8, and the covering part of the elastic tip 11 to cushion the end of the teat cup where it meets the junction of the teat and the udder, preventing discomfort, for an abrupt angle is thereby avoided.

Modifications or changes in the forms and arrangements of other parts of the teat cup as related to this type of incurved end housing, are in any of their combinations therewith, covered by the principles of this invention and within the scope of their protection.

Having described my invention, what I claim as new and desire to secure by Letters Patent, is:

1. A rigid tubular cylindric teat-cup having its open teat-receiving end curved domically inwardly and annularly.

2. A rigid tubular cylindric teat-cup body having its teat-receiving end curved inwardly domically annularly about its longitudinal axis, and an elastic cylindric tubular body mounted within said teat-cup with an end inverted to fit domically about said curved teat-receiving end.

3. A rigid tubular teat-cup body having its teat-receiving end curved inwardly domically annularly, an elastic cylindric tubular body mounted within said teat-cup body with its other end inverted about and fitting said curved end removably, and a rigid tubular cap curved at one end inwardly domically to fit upon the inverted part of said elastic body removably to secure it upon the teat-cup body.

4. In combination, a hollow rigid open-end teat-cup having its upper end contracted inwardly, and an elastic liner of open end tubular shape positioned within said rigid teat-cup with its open end projecting from and inverted over and to exteriorly fit upon the contracted end of the teat-cup, the contracted end of the rigid teat-cup acting as a rigid support for the liner and to supply clearance under the contraction to permit pneumatic action along the full length of the liner therebelow upon a contained teat as far as the root of the teat equally.

Signed at Waterloo, Iowa, this 8th day of August, 1921.

CHARLES M. ANDERSON.